United States Patent [19]

Payne et al.

[11] 4,424,439
[45] Jan. 3, 1984

[54] PROTECTIVE METHOD AND CIRCUIT ARRANGEMENT FOR APPLIANCE INCORPORATING SHEATHED HEATING ELEMENT

[75] Inventors: Thomas R. Payne, Louisville; Robert V. Chou, Prospect, both of Ky.

[73] Assignee: General Electric Company, Louisville, Ky.

[21] Appl. No.: 337,877

[22] Filed: Jan. 7, 1982

[51] Int. Cl.³ .............................................. H05B 1/02
[52] U.S. Cl. .................................... 219/501; 219/492; 219/517; 219/544; 361/42; 338/238
[58] Field of Search ............... 219/505, 322, 485, 517, 219/509, 510, 501, 492, 497, 216; 361/42, 50, 100, 104, 103; 338/238, 277, 334

[56] References Cited

U.S. PATENT DOCUMENTS

| | | | |
|---|---|---|---|
| 3,789,190 | 1/1974 | Orosy et al. | 219/497 |
| 3,881,085 | 4/1975 | Traister | 219/216 |
| 4,109,134 | 8/1978 | Van Herten | 219/501 |
| 4,219,857 | 8/1980 | Haraldsson et al. | 361/42 |

*Primary Examiner*—M. H. Paschall
*Attorney, Agent, or Firm*—H. Neil Houser; Radford M. Reams

[57] ABSTRACT

A protective control arrangement for heating units of the type comprising the concentric assembly of a resistance heating element embedded in an insulating material and enclosed within a metallic sheath for limiting the propagation of a rupture in the sheath resulting from an arc at a discontinuity in the heating element along a substantial portion of the length of the sheath. The control arrangement of the illustrative embodiment includes a power control triac operatively connected to the heating element for selectively coupling the heating element to an external power supply. A preprogrammed microprocessor operatively connected to the gate terminal of triac is effective to periodically interrupt power to the heating element by opening the switch means for interrupt periods of predetermined duration. The time between successive ones of these interrupt periods is determined such that extinction of any arc which may develop at a discontinuity in the heating element occurs before any resultant separation can propagate along a substantial portion of the sheath; and the duration of each of these interrupt periods is at least approximately equal to the nominal recovery time for the insulating material required to allow the insulating material to return from its relatively low resistance molten and plasma state to its relatively high resistance state. By periodically interrupting energization of the heating unit in this manner, any arc which occurs is extinguished by the next occurring interrupt period.

16 Claims, 7 Drawing Figures

PROTECTIVE METHOD AND CIRCUIT ARRANGEMENT FOR APPLIANCE INCORPORATING SHEATHED HEATING ELEMENT

CROSS-REFERENCE TO RELATED APPLICATION

This application is related to the following commonly-assigned, copending U.S. patent application, Ser. No. 337,878, filed Jan. 7, 1982, in the name of Thomas R. Payne. The disclosure of the above-noted application is hereby incorporated by reference.

BACKGROUND OF THE INVENTION

The present invention relates generally to protective methods and circuits for sheathed electrical resistance units. More particularly, the invention relates to a method and circuits for reliably preventing or interrupting a fault in the form of an arcing short which may occur between the heating element and the grounded outer sheath of such a heating unit. Conveniently, and by way of example, the invention may be employed in household appliances incorporating heating units such as ranges, hot-plates and other cooking appliances, as well as dishwashers.

Sheathed electrical resistance heating units have been employed for many years in various products including, for example, electric ranges and dishwashers. Such heating units generally comprise a heating element in the form of a spiralled, electric resistance wire encased in an elongated, ceramic-filled, metallic outer sheath which is electrically conductive. The ceramic material transmits heat but, in its normal state, is an electrical insulator. Thus, the outer sheath becomes thermally hot but normally remains electrically insulated from the heating element. A suitable ceramic material is magnesium oxide. Sheathed electrical resistance heating units of this general type are described in U.S. Pat. No. 2,094,480 to Vogel; and U.S. Pat. No. 3,592,771 to Vedder et al, the disclosures of which are hereby incorporated by reference.

In the operation of such heating units, the terminals of the heating element are connected to a power source, for example, a 60 Hz household AC power line which may be 120 volts or 240 volts. A 120 volt heating unit is normally connected between the hot side and neutral of a 120 volt unbalanced to ground line. A 240 volt heating unit is normally connected across both sides of a 240 volt balanced line. Normally, the outer conductive sheath is grounded.

Though such heating units for the most part perform satisfactorily, one failure mode which is possible in such a heating unit is associated with a breakdown in the insulation qualities of the magnesium oxide separating the heating element from the outer sheath, accompanied by the formation of a current path between the element and the outer sheath. For reasons not fully presently understood, occasionally a discontinuity develops in the heating element resulting from a physical separation or break in the element itself. This break in the element creates an arc at the discontinuity between the two ends created by the break. The intense heat from the arc rapidly creates a plasma condition in which some of the magnesium oxide material in the vicinity of the arc is vaporized and some melted. The nature of the magnesium oxide is such that in its normal solid state it provides a very high resistance; however, in its molten liquid and gaseous plasma state the resistance becomes much less. Thus, as the magnesium oxide melts and vaporizes, eventually a current path of relatively low resistance is formed from the discontinuity through the gaseous and molten liquid MgO to the grounded metallic sheath. At this point, the arc transfers from one or both break-created ends of the heating element to the sheath. The force generated by this phenomenon may in some cases actually create a separation in the outer sheath. Once it starts, such a separation in the outer sheath travels lengthwise along the sheath. This phenomenon is commonly referred to as "zippering" because the propagation of the separation along the outer sheath resembles the opening of a zipper.

One device for rapidly terminating "zippering," should it occur in a heating element of the type employed in a dishwasher, is disclosed in U.S. Pat. No. 4,044,224 issued to Jenkins and Herbst. The Jenkins and Herbst device replaces the direct electrical connection between the outer conductive sheath and ground with a fusible link. During normal operation of the heating unit when the insulation material is intact, substantially no current flows through the outer sheath ground connection (with the exception of a small amount of AC leakage current largely a the result of capacitive effects). However, when a fault occurs, sufficient current flows through the outer sheath ground connection, causing the fusible link to open. Additional examples of switching and fuse arrangements responsive to changes in current supplied to the heating unit occasioned by ground faults may be found in commonly-assigned U.S. Pat. No. 4,054,857 to Bowling; and commonly-assigned, co-pending patent application Ser. No. 282,574 to Wellman and Horning, as well as British Pat. No. 946,623 to Ryder. Each of these latter references disclose current actuated switching arrangements employed in ranges and cooking appliances to disconnect power from the heating unit in the event of a ground fault.

While arrangements of the type known in the art provide generally satisfactory results, it would be desirable to provide a protective circuit arrangement which would prevent the propagation of the disruption of the heating unit sheath by extinguishing the arc before sufficient heat has been generated to initiate such disruption or limit its propagation by extinguishing the arc before such disruption has propagated significantly, without need for the relatively costly, current responsive fuse or relay arrangements of the prior art.

It is, therefore, an object of the present invention to provide a protective control arrangement for heating units which extinguishes arcs which may develop between the heating element and the outer sheath of the heating unit so as to prevent or minimize propagation of resultant disruptions to the sheath without additional ground fault interrupt circuitry.

SUMMARY OF THE INVENTION

Briefly stated and in accordance with one aspect of the invention, there is provided a protective control arrangement for heating units of the type comprising the concentric assembly of a resistance heating element embedded in an insulating material and enclosed within a metallic sheath.

The control arrangement comprises switch means operatively connected to the heating element for selectively coupling the heating element to an external power supply. Control means operatively connected to the switch means is effective to periodically interrupt power to the heating element by opening the switch means for interrupt periods of predetermined duration. The time between successive ones of these interrupt periods is determined such that extinction of any arc which may develop at a discontinuity in the heating element occurs before any resultant separation can propagate along a substantial portion of the sheath; and the duration of each of these interrupt periods is at least approximately equal to the nominal recovery time for the insulating material required to allow the insulating material to return from its relatively low resistance molten and plasma state to its relatively high resistance state. By periodically interrupting energization of the heating unit in this manner, any arc which occurs is extinguished by the next occurring interrupt period.

DETAILED DESCRIPTION OF THE INVENTION

While the novel features of the invention are set forth with particularity in the appended claims, the invention both as to organization and content will be better understood and appreciated along with other objects and features thereof from the following detailed description taken in conjunction with the drawings.

Figure 1:
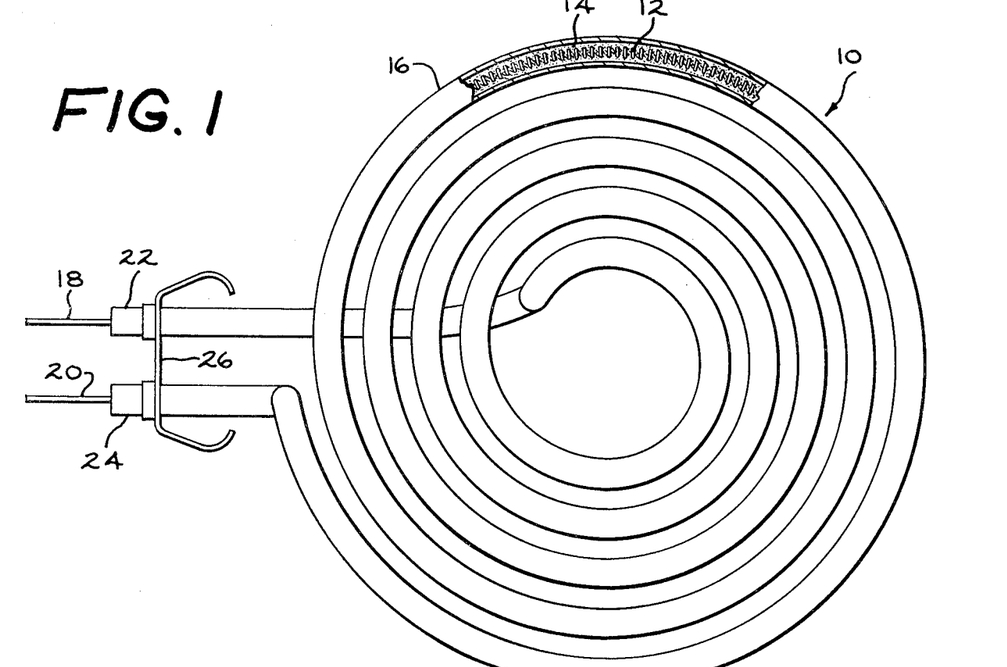
FIG. 1 is a simplified plan view of a sheathed electrical heating unit of the type employed with the protective control arrangement of the present invention, partially in section, to show the interior of the heating element.

Referring now to the drawings wherein identical reference numerals denote similar or corresponding elements throughout the various figures, FIG. 1 shows the physical arrangement of an electrical heating unit of the type employed with the protective arrangement of the present invention. Heating unit 10 is of conventional sheathed heating unit construction comprising the concentric assembly of a resistive heating element 12 of spiral or helical configuration embedded in an insulating material 14 such as a compacted formulation of magnesium oxide powder which serves both as a thermal conductor and an electrical insulator, enclosed within a metallic sheath 16. Opposite connecting pins 18 and 20 of heating element 14 extend from the radially projecting end portions 22 and 24 of sheath 16 respectively, for connection to an external power supply, when installed in a cooking appliance. A grounding clip 26 formed of a strip of thin conductive material, such as stainless steel, is secured across end portions 22 and 24 of the outer sheath 16 to provide a ground connection for the sheath when installed in a heating apparatus.

As mentioned briefly in the Background discussion, heating elements of the type shown in FIG. 1 for reasons not fully understood are susceptible to discontinuities developing in the resistive element. Such discontinuities, for example, may result from oxidation at a point on the heating element which reduces the wire to a very fine filament which ultimately breaks, creating the discontinuity. The oxidation may be the result of a hot spot occurring along the element due to poor thermal conductivity at that point. Another possibility is a foreign substance present in the insulating material which may attack the protective outer layer of non-porous chrome oxide which ordinarily protects the heating element against destructive oxidation. In any event, when such a discontinuity develops in an energized heating element, an arc is developed at the discontinuity between the resultant slightly separated ends of the now broken element. The intense heat generated by the arc is sufficient to rapidly change the insulating material immediately proximate to the arc to a plasma state. At the fringe of the plasma region the insulating material is changed to a molten liquid state. The plasma region expands radially toward the outer sheath as the heat from the arc progressively vaporizes the insulating material. At the same time, the heating element itself is gradually consumed increasing the gap which must be bridged by the arc. At some point, as the plasma progresses toward the sheath, the insulating material between the discontinuity and the sheath becomes substantially non-crystalline, i.e., primarily a combination of plasma and molten liquid, at which time a relatively low resistance path exists between the heating element and the sheath. The low resistance path results from the fact that although in its normal solid or crystalline state the insulating material is characterized by a high resistance, in its plasma and liquid states its resistance is relatively low. When such a condition exists and the element-to-element arc length becomes greater than the element-to-sheath distance, the arc transfers from bridging the gap in the heating element to bridging the gap between one or both of the break-created ends of the element and the grounded sheath. The arc from element to sheath disrupts or separates the sheath proximate to the arc. This disruption then progresses along the length of the heating element away from the break in the element toward a connecting pin. The break may propagate in one direction from one side of the discontinuity or in both directions, starting from each side of the discontinuity. If allowed to propagate to a connecting pin, the phenomena will terminate with a potentially large current surge caused by the dead short to ground presented to the power source upon reaching an end of the element. Therefore, it is desirable to extinguish the arc before the disruption has propagated to a connecting pin.

The heating unit employed in the illustrative embodiment herein described is a standard range surface unit commercially available from General Electric Company identified by Part Number WB30X218. It has been observed that for such heating units an arc at a discontinuity in the heating element has associated with it a nominal breakdown time for sufficiently reducing the insulating material proximate to its relatively low resistance state so as to provide a relatively low resistance current path from the discontinuity to the sheath. This time varies, depending upon the operating state of the heating element at the time the discontinuity occurs. The time required for the insulating material to form a low resistance path from the element to the sheath, should such a discontinuity develop when the element is initially energized and thus relatively close to room temperature, will be longer than that required if the discontinuity occurs while the element is operating at a steady state operating temperature. Also, the time required is a function of the configuration of the heating element, the exact composition of the insulating material and other design features. However, it is believed, based upon observations, that for heating elements of the type employed in the illustrative embodiment, which is representative of those presently conventionally employed in domestic electric ranges, should the discontinuity occur when the element has been operating at or near its maximum operating power in a steady state mode, a nominal breakdown time on the order of one second or less is required from the initiation of the arc to initial disruption of the sheath. As mentioned hereinbefore, if unchecked, the arc at the discontinuity may transfer to the sheath and generate sufficient heat to rupture the sheath.

While propagation of the separation is somewhat unpredictable, based upon laboratory test observations it is believed that typically the separation propagates along heating units of the type normally used as surface heating units for cooking appliances at a rate on the order of 2-3 inches per minute.

It has further been observed that the insulating material of such heating units has associated with it a nominal recovery time required to allow the resultant relatively low resistance insulating material sufficiently to re-crystallize to a relatively high resistance hardened state upon extinguishing the arc by interruption of power to the heating element. For typical cooking appliance heating units, this nominal recovery time has been observed to be less than 8.3 milliseconds, corresponding to one half-cycle of the standard 60 Hz power signal.

In accordance with the present invention, there is provided a protective control arrangement which limits the propagation of the disruptions along the length of the sheath and may prevent such disruptions from occurring by periodically deenergizing the heating element so as to interrupt any arc which may have developed since the last occurring interrupt and maintaining the interruption for a period of time sufficient to allow the molten and gaseous insulating material proximate the arc to return to a relatively high resistance state so as to once again effectively insulate the heating element from the grounded sheath.

Figure 2:
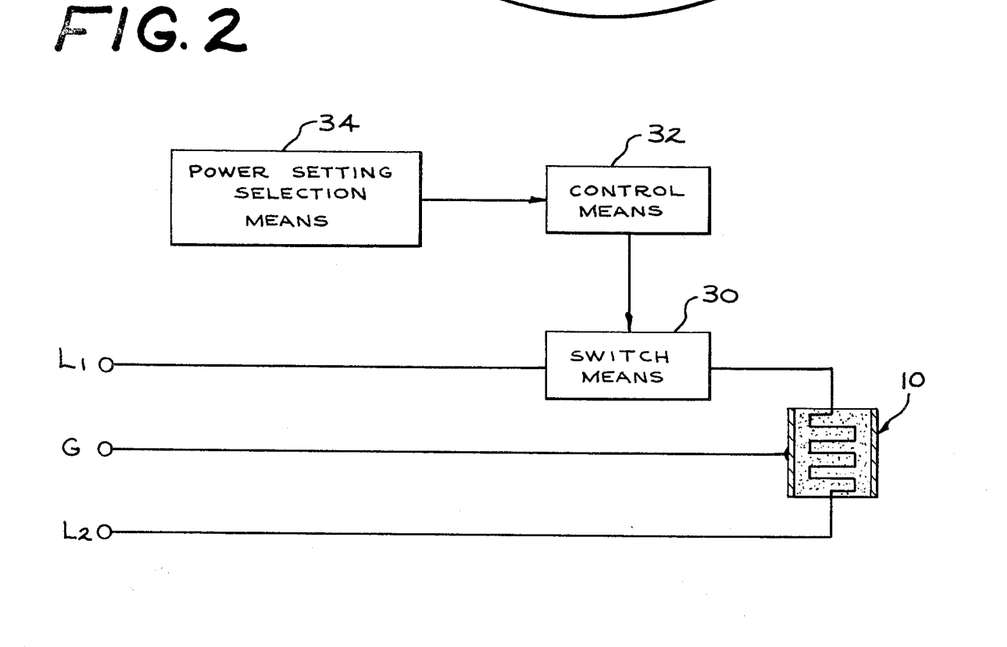
FIG. 2 is a greatly simplified functional block diagram of the control arrangement of the present invention.

A generalized block diagram illustrating a protective arrangement in accordance with this invention is shown in FIG. 2, wherein heating unit 10 is energized by a standard 60 Hz AC power supply which can be 120 volts or 240 volts applied across terminals L1 and L2. Power applied to the heating element 10 is controlled by switch means 30 connected in series with heating element 10. Switch means 30 is switched into conduction by trigger signals generated by the control means 32. Control means 32 generates these trigger signals in accordance with a power setting entered by the user via input selection means 34. Selection means 34 functionally represents a keyboard having six control switches including an OFF switch and five power setting switches, enabling the operator to select one of five discrete power settings or OFF. Clearly, a greater or fewer number of power settings could be provided.

Control means 32 performs the protective function in accordance with the present invention by periodically switching switch means 30 to its non-conductive state and maintaining it in its non-conductive state for a predetermined interrupt period.

In selecting an interrupt rate, that is, the time period between successive interrupts, a balance must be struck between, on the one hand, relatively short time periods requiring excessive switching which could shorten the lifetime of the switching devices and providing unacceptable heating efficiency and, on the other hand, relatively long time periods resulting in higher than desirable possibilities of a separation propagating to a connecting pin.

In estimating the latter possibilities, it is assumed that a discontinuity may occur with equal probability at any point in the heating element. Thus, the chances of a discontinuity occurring within a certain distance d of one of the connecting pins may be expressed as the ratio of the distance d to the total sheath length L. Since there are two connecting pins, should such a discontinuity occur, the chances of the discontinuity occurring within distance d of either pin is obtained by doubling this ratio.

For a given propagation rate r, and time between interrupts T, the maximum distance of propagation between interrupts is $r \times T$. Thus, if a discontinuity occurs within this maximum propagation distance of either connecting pin, $r \times T$, i.e., if $d = r \times T$, the probability of a separation propagating to a connecting pin may be expressed as $$\frac{2 \times (r \times T)}{L}.$$

A nominal propagation time for purposes of this description is defined as the time required for a disruption or separation to travel ¼ of the length of the heating unit. The ratio of twice this distance to the total length of the heating unit is ½. Thus, the probability of a discontinuity occurring at a point along the sheath which could travel to a connecting pin in this nominal propagation time is ½. Stated another way, if the time between interrupts is selected to be equal to the nominal propagation time, 50 percent of the ruptures which occur would be terminated before propagating to a connecting pin. For a propagation rate of 3 inches/minute and a 60 inch heating unit sheath, the nominal propagation time is 5 minutes.

By selecting a time between interrupts which is less than 5 minutes, more than 50 percent of ruptures which occur would be terminated before propagating to a connecting pin; how much more than 50 percent is determined by how much less than this nominal propagation time the period between interrupts is selected to be. For a time period between interrupts of one minute or less this figure would be in the range of 10 percent or less. This corresponds to a maximum propagation distance of 5 percent or less of the total length of the sheath. For a propagation rate of 3 inches/minute and a unit length of 60 inches, the distance would be on the order of 3 inches.

In the illustrative embodiment, a time between interrupts of 16 seconds is selected. Using the above formula and substituting r=3 inches/minute, L=60 inches and d=0.80 inches, the probability, expressed as a percentage, of a separation, should one occur, propagating to a connecting pin is less than 3 percent which is considered to be well within desirable limits.

For this time period, the maximum duration of the separation or "zippering" phenomena is slightly less than 16 seconds since a finite time on the order of ½-1 second is required from the beginning of the arc until the initial sheath separation occurs. At a propagation rate of 3 inches/minute, the maximum propagation distance is roughly ¾ inches. Consequently, this choice of time period confines the duration of the propagation period within acceptable limits, thereby preventing the separation from propagating along a substantial portion of the length of the heating element.

The duty cycle power control scheme of the illustrative embodiment is described for illustrative purposes and is not an essential part of the present invention. It is to be understood that the protective arrangement of the present invention is not dependent upon this particular power control scheme. Rather, as will become apparent to those skilled in the art, the protective arrangement of the present invention is readily adaptable for use in appliances in which variable power levels for the heating element are unnecessary, such as dishwashers. Control means 32 functions to select the percentage of time the switch means is conductive in response to various operator settings. More specifically, control means 32 controls the percentage of time during each control period that power is applied to heating element 10. In the illustrative embodiment, a predetermined control period comprising a fixed number of control intervals is employed. The control means switches the switch means into conduction for a particular number of these control intervals based on the operator selected power settings. The ratio of conductive control intervals to total control intervals in the control period, expressed as a percentage, is referred to hereinafter as a duty cycle, a predetermined duty cycle being uniquely associated with each power setting. In the illustrative embodiment of the present invention, a control period of five cycles of the 60 Hz power signal is employed. In this embodiment, duty cycles of 20%, 40%, 60%, 80% and 100% correspond to the power settings 1-5, respectively, are achieved by providing 1, 2, 3, 4 and 5 conductive cycles per control period, respectively.

For purposes of illustration, assume that power setting 3 calling for a duty cycle of 60% is selected. Control means 32 then switches switch means 30 into conduction for 3 consecutive power signal cycles and out of conduction for the next 2 successive cycles of each five cycle control period.

Figure 3:
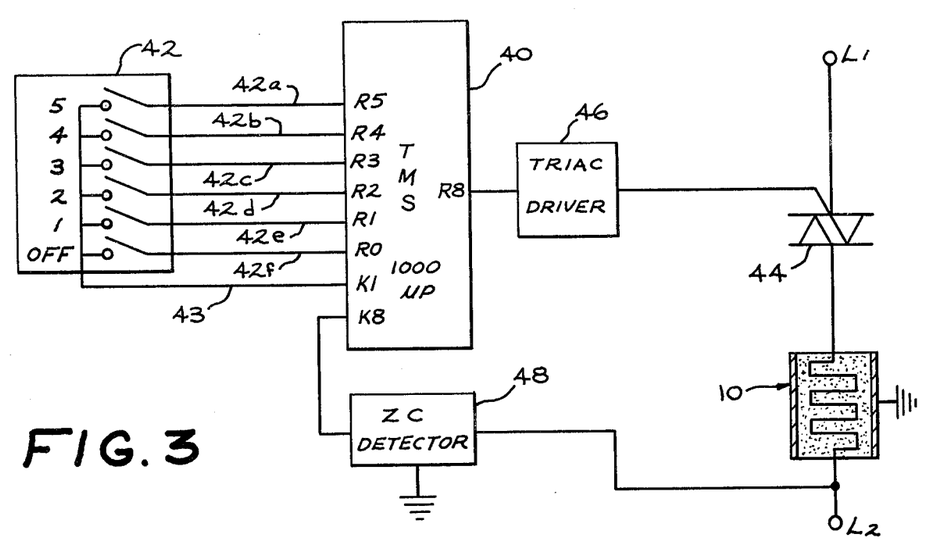
FIG. 3 is a schematic diagram of a microprocessor based control circuit illustratively embodying the control arrangement of the present invention.

FIG. 3 schematically illustrates a microprocessor control circuit for a single heating unit appliance, such as a hotplate, which incorporates an illustrative embodiment of the protective arrangement of the present invention. Power control for the appliance is provided electronically by a TMS 1000 Series Microprocessor 40. Technical details concerning the general characteristics of microprocessor 40 are available in a Texas Instruments Incorporated publication entitled, ".TMS 1000 Series Data Manual" published in December 1975, which is hereby incorporated by reference.

In the embodiment of FIG. 3, microprocessor 40 has been customized by permanently configuring the Read Only Memory (ROM) to implement the protective control arrangement of the present invention. Keyboard 42 is a mechanical keyboard which includes six keys enabling the operator to select from an OFF setting and five power settings. Keyboard 42 is electrically connected to microprocessor 40 via six keyboard input lines 42a-42f which couple swiches for the OFF through 5 to output ports R0 through R5 of microprocessor 40, respectively. When one of these keys is depressed, the corresponding switch closes connecting the associated one of keyboard input lines 42a-42f with common keyboard output line 43. Output line 43 is coupled to input port K1 of microprocessor 40. Thus, closure of one of the keyboard keys couples any signal present on that input line directly to input port K8 via the keyboard output line.

Scanning of keyboard 42 to detect a user input is accomplished by causing a scanning signal in the form of a voltage pulse to appear sequentially at output ports R0-R5 of the microprocessor. If a key is depressed, the pulse present on the keyboard input line associated with the depressed key will be coupled directly to input port K1 of the microprocessor via keyboard common output line 43, indicating to the microprocessor that an operator input is present at the key currently being scanned.

Power applied to heating element 10 is controlled by a conventional triac 44 connected in series with the heating element. Triac 44 is triggered into conduction by triac trigger signals generated by the microprocessor at output port R8 and coupled to the gate terminal of triac 44 via a conventional triac driver network 46. A conventional zero crossing detection circuit 48 is coupled to microprocessor input port K8 to enable the microprocessor to synchronize triac switching with zero crossings of the power signal applied across terminals L1 and L2 from an external 60 Hz power supply such as the standard 120 or 240 volts domestic supply. While a triac is employed as the switch means of the illustrative embodiment, it is to be understood that a relay switch arrangement could be similarly employed.

CONTROL PROGRAM

The control program which is permanently configured in the ROM of the microprocessor to enable the processor to perform the desired control functions will be described with reference to the flow diagrams of FIGS. 4 through 7. The control program is executed once during each control interval; that is, once during each cycle of the voltage signal from the external power supply. Each of these routines is cycled through sequentially during each execution of the program. It should be understood that in addition to the control functions hereinafter described, there may be other control functions to be performed in conjunction with other operating characteristics of the appliance. Instructions for carrying the routines described may be interleaved with instructions and routines for such other control functions. A description of the control program of the illustrative embodiment with reference to the flow diagrams follows.

Figure 4:
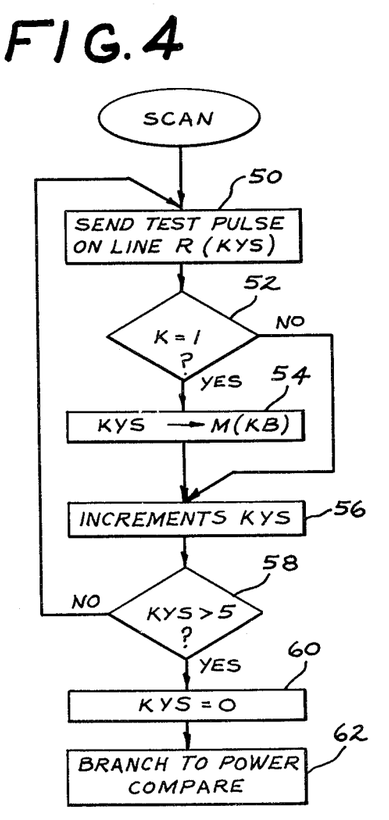
FIG. 4 is a flow diagram of the SCAN routine incorporated in the control program for the microprocessor in the circuit of FIG. 3.

SCAN ROUTINE—FIG. 4

In this routine the keyboard keys are sequentially scanned to determine whether a new power setting has been selected. All six keys are sequentially scanned in this routine, during each control interval. It will be recalled that the microprocessor has six output lines R0 through R5 electrically connected to keyboard 5, each line being associated with one key. These are scanned in the following manner:

The R0-R5 output ports are sequentially addressed by a counter KYS which serves to place a scanning pulse on the addressed output line designated R(KYS) (Block 50). Concurrently, input port K1 is monitored (Inquiry 52) to detect the presence of the test pulse signifying depression of the addressed key. K1=1 indicates the key associated with the pulsed line has been actuated. If K1=1, the count of counter KYS is stored in the control register as the control signal designated M(KB) (Block 54). The KYS counter is then incremented (Block 56). If K1 is not equal to 1, Block 54 is bypassed and KYS is incremented (Block 56) to scan the next line. Inquiry 58 terminates the scan process when all six lines have been scanned. If the count of counter KYS is not greater than five, the program returns to Block 1 to scan the next key. If KYS is greater than five, indicating that all six lines 0-5 have been scanned, KYS is reset to zero (Block 60) and the program branches (Block 62) to the Power Compare Routine, FIG. 5.

Figure 5:
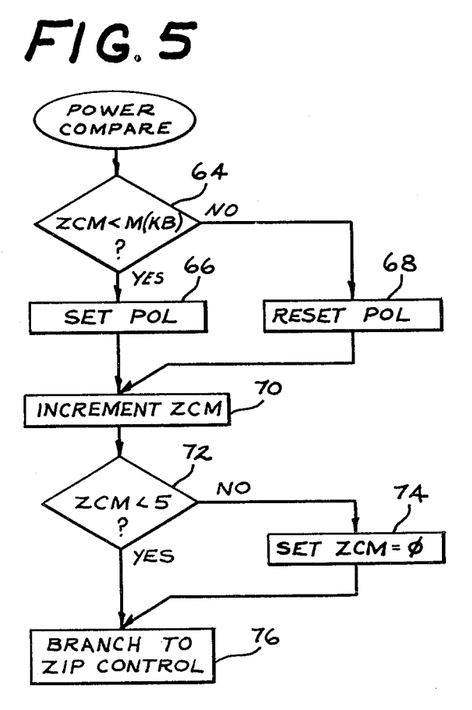
FIG. 5 is a flow diagram of the POWER COMPARE routine incorporated in the control program for the microprocessor in the circuit of FIG. 3.

POWER COMPARE ROUTINE—FIG. 5

The function of this routine is to implement the duty cycle power control scheme by making the control decision, i.e., decide whether or not the heating unit is to be energized during the next control interval. This decision is made by comparing the control signal M(KB) with the contents of a master counter ZCM. ZCM is incremented during each execution of this routine and thus effectively counts power supply cycles. The master counter ZCM repetitively counts a predetermined number of full cycles of the voltage signal from the 60 Hz power supply applied across L1 and L2 equal to the number of control intervals in the control period and resets. The digital control signal M(KB) generated in the SCAN program is the binary representation of the number of conductive cycles associated with the duty cycle for the selected power setting. Thus, the maximum count of the ZCM counter can be visualized as representing the total control period with the conductive portion of the control period being represented by M(KB). For example, assume again power setting 3 has been selected for a duty cycle of 60%. As previously described, this requires three consecutive conductive cycles or control periods followed by two non-conductive cycles. For counts 0, 1 and 2, ZCM is less than M(KB). For counts 4 and 5, ZCM is greater than or equal to M(KB). Thus, when ZCM is less than M(KB), the decision is to energize the heating element and otherwise not to energize the element. Thus, the desired duty cycle is implemented by setting the Power Out Latch described hereinafter with reference to the Power Out Routine, FIG. 7, when ZCM is less than M(KB) and resetting when it is greater than or equal to M(KB).

Referring now to FIG. 5, Inquiry 64 compares the count of the ZCM counter with the control signal of M(KB). If ZCM is less than M(KB), the Power Out LATCH (POL) is set (Block 66). If ZCM is not less than M(KB), Power Out Latch (POL) is reset (Block 68). The ZCM counter is incremented (Block 70) and Inquiry 72 checks the count of ZCM. When the count equals 5, ZCM is reset to 0 (Block 74). The program then branches (Block 76) to the Zipper Control Routine, FIG. 6.

Figure 6:
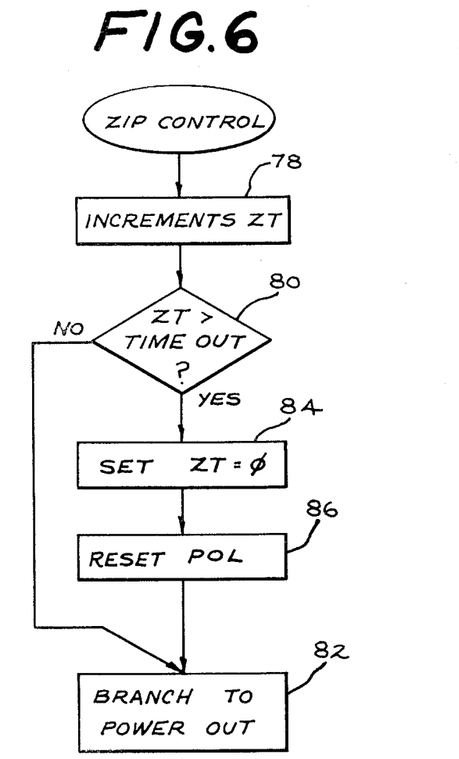
FIG. 6 is a flow diagram of the ZIPPER CONTROL routine incorporated in the control program for the microprocessor in the circuit of FIG. 3.

ZIPPER CONTROL ROUTINE—FIG. 6

The function of the Zipper Control Routine is to perform the protective function of the arrangement of the present invention by periodically interrupting power to the heating element independently of the power setting selected. A Zipper Control Timer (ZCT) effectively counts power signal cycles of the voltage signal from the external power supply by being incremented upon each execution of the control program which occurs once during each full cycle of the 60 Hz power supply voltage signal. When a predetermined count is reached corresponding to a predetermined number of voltage signal cycles, the Power Out Latch is reset. As will be described with reference to the Power Out Routine of FIG. 7, the effect of resetting the Power Out Latch is to interrupt energization of the heating element for one power signal cycle.

Referring now to FIG. 6, the Zipper Control Timer (ZCT) is incremented (Block 78), Inquiry 80 then checks the count of counter ZCT. If ZCT is less than or equal to the predetermined count designated Time Out, the program then branches (Block 82) to the Power Out Routine, FIG. 7. If the count is greater than Time Out, the Zipper Control Timer ZCT is reset (Block 84), the Power Out Latch is reset (Block 86), and the program branches (Block 82) to the Power Out Routine. The period of time between interrupts is determined by selection of the Time Out parameter. In the illustrative embodiment, a period of 16 seconds is desired between interrupts. Sixteen seconds corresponds to 960 voltage signal cycles for a 60 Hz power supply. Thus, in the illustrative embodiment, the Time Out parameter is set at 960. As a result, every 16 seconds the POL is reset thereby inhibiting a trigger signal to triac 44 for one cycle of the power supply regardless of the power setting selected by the user, thereby insuring that power to the heating element will be interrupted for one full cycle of the 60 Hz voltage supply (16.7 milliseconds) every 16 seconds.

Figure 7:
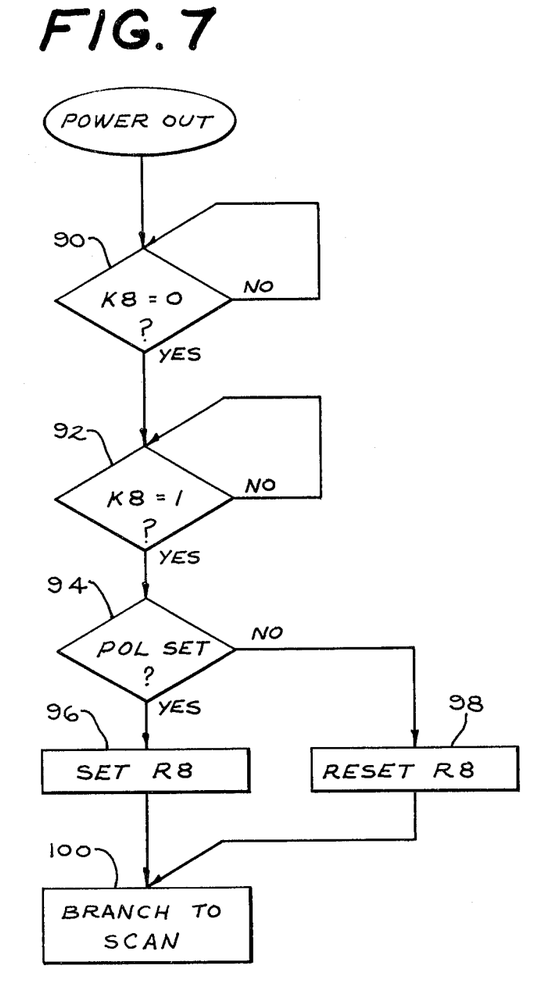
FIG. 7 is a flow diagram of the POWER OUT routine incorporated in the control program of the microprocessor in the circuit of FIG. 3.

POWER OUT ROUTINE—FIG. 7

The Power Out Routine via Inquiries 90 and 92 delays the control program until the beginning of the next power supply cycle at which time Inquiry 94 checks the state of the Power Out Latch. If the Power Out Latch is set, indicating the element is to be energized during the ensuing control interval, output port R8 is set (Block 96) which generates a trigger signal via the triac drive network to the gate terminal of triac 44 thereby switching triac 44 into conduction. If the POL is not set, output port R8 is reset (Block 98) inhibiting the trigger signal to triac 44 rendering it non-conductive for the ensuing control interval. The program then returns (Block 100) to the SCAN Routine (FIG. 4) to repeat the routine.

While in accordance with the Patent Statutes a specific illustrative embodiment of the present invention has been illustrated and described herein, it is realized that numerous modifications and changes will occur to those skilled in the art. For example, the arrangement of the present invention could readily be adapted for implementation in other appliances, such as dishwashers. It is therefore to be understood that the appended claims are intended to cover all such modifications and changes as fall within the true spirit and scope of the invention.

What is claimed is:

1. A protective control arrangement comprising: a heating unit comprising a concentric assembly of a resistive heating element embedded in an insulating material and enclosed within a metallic sheath, said insulating material in its normal state being characterized by a very high resistance, said resistive element being adapted for energization by an external power supply, said heating unit being susceptible to a discontinuity developing in said resistive element when energized which can result in an electrical arc at the discontinuity, the arc being effective to reduce said insulating material proximate to the arc to a relatively low resistance state to create a relatively low resistance current path from the discontinuity to said sheath and ultimately rupture said sheath, the arc and rupture then if unchecked propagating along the length of said sheath, the period of propagation being the time between initiation and termination of such propagation, said insulating material having associated therewith a nominal recovery time required to allow the resultant relatively low resistance insulating material to return to a relatively high resistance state upon extinguishing the arc by interruption of power to said heating element;

switch means operatively connected to said heating element for selectively coupling said heating element to the external power supply; and control means operatively connected to said switch means and effective to periodically interrupt power to said heating element by opening said switch means for interrupt periods of predetermined duration; the time between successive ones of said interrupt periods being selected to confine the duration of the period of propagation within predetermined limits and the duration of each of said interrupt periods being at least approximately equal to the nominal recovery time thereby preventing the propagation of a relatively low resistance current path from said heating element to said metallic sheath through said insulating material along the length of said heating unit resulting from the occurrence of a discontinuity in said heating element.

2. A protective control arrangement according to claim 1 wherein said period between successive ones of said interrupt periods is not greater than sixteen seconds.

3. A protective control arrangement according to claims 1 or 2 wherein the duration of each said interrupt period is greater than approximately 8.0 milliseconds.

4. A protective control arrangement comprising: a heating unit comprising the concentric assembly of a resistive heating element embedded in an insulating material and enclosed within a metallic sheath, said insulating material in its normal state having a very high resistance, said heating element being adapted for energization by an external 60 Hz alternating current power supply and said metallic sheath being adapted to be electrically grounded, said heating unit being susceptible to a discontinuity developing in said resistive element when energized which can result in an electrical arc at the discontinuity, the arc being effective to reduce said insulating material proximate to the arc to a relatively low resistance state sufficient to create a relatively low resistance current path from the discontinuity to said sheath and ultimately rupture said sheath, the arc and rupture then if unchecked propagating along the length of said sheath at a nominal predetermined propagation rate, the period of propagation being the time from initiation to termination of such propagation, said insulating material having associated therewith a nominal recovery time required to allow the resultant relatively low resistance insulating material to return to a relatively high resistance state following extinguishing of the arc by interruption of power to said heating element;

switch means operatively connected to said heating element for selectively coupling said heating element to the external power supply; and control means operatively connected to said switch means and effective to periodically interrupt power to said heating element by opening said switch means for interrupt periods of predetermined duration, the time between successive ones of said interrupt periods being selected to confine the duration of the period of propagation within predetermined limits and the duration of each of said interrupt periods being at least as long as the nominal recovery time, thereby preventing the propagation of a relatively low resistance, insulating material current path from said heating element to said sheath along the length of said heating unit.

5. A protective control arrangement according to claim 1 wherein said period between said interrupt periods is selected to confine the duration of the period of propagation to a period which limits the propagation at the nominal rate to a distance which is less than 5 percent of said total length of the sheath.

6. A protective arrangement in accordance with claim 5 wherein said period between said interrupt periods is not substantially greater than sixteen seconds.

7. A protective arrangement in accordance with claim 4 or 5 or 6 wherein said interrupt period comprises at least one-half cycle of the power signal from the external 60 Hz power supply.

8. A protective control arrangement comprising: a heating unit comprising the concentric assembly of a resistive heating element embedded in an insulating material and enclosed within a metallic sheath, said insulating material in its normal state being characterized by a very high resistance said resistive element being adapted for energization by an external power supply, said heating unit being susceptible to a discontinuity developing in said resistive element when energized which can result in an electrical arc at the discontinuity, the arc being effective to reduce said insulating material proximate to the arc to a relatively low resistance state, thereby providing a relatively low resistance current path from the discontinuity to said sheath and ultimately rupturing said sheath, the rupture then propagating along the length of said heating unit, said heating unit having associated therewith a nominal propagation time required for the rupture to propagate along a substantial portion of the length of said heating unit; said insulating material having associated therewith a nominal recovery time required to allow the resultant relatively low resistance insulating material to return to a relatively high resistance state upon extinguishing the arc by interruption of power to said heating element;

switch means operatively connected to said heating element for selectively coupling said heating element to the external power supply; and control means operatively connected to said switch means and effective to periodically interrupt power to said heating element by opening said switch means for interrupt periods of predetermined duration; the time between successive ones of said interrupt periods being less than the nominal propagation time for said heating unit and the duration of each of said interrupt periods being at least approximately equal to the nominal recovery time for said insulating material, thereby preventing the propagation of the arc and rupture in said sheath along a substantial portion of the length of said heating unit resulting from the occurrence of a discontinuity in said heating element.

9. A protective control arrangement according to claim 8 wherein said period between successive ones of said interrupt periods is not greater than sixteen seconds.

10. A protective control arrangement according to claims 8 or 9 wherein the duration of each said interrupt period is at least 8 milliseconds.

11. A method of preventing the propagation of a relatively low resistance current path from the heating element to the sheath in a heating unit comprising the concentric assembly of a resistive heating element adapted for energization by an external power supply embedded in an insulating material and enclosed within a metallic sheath adapted for electrical grounding, the insulating material having in its normal state a very high resistance, and in its molten and plasma state having a relatively low resistance, the heating unit being susceptible to a discontinuity developing in the resistive element when energized which can result in electric arcing at the discontinuity, such arcing having associated therewith a nominal minimum time for reducing the insulating material proximate the discontinuity to its relatively low resistance molten and plasma state, such reduction of the insulating material creating a relatively low resistance current path from the discontinuity to the sheath and the resulting arc rupturing the sheath, the rupture if unchecked then propagating along the length of the sheath, the period of propagation being the time between initiation and termination of such propagation, the insulating material having associated therewith a nominal recovery time required to allow the resultant molten insulating material to cool to a relatively high resistance state following extinguishing of the arc by interruption of power to the heating element, said method comprising steps of:
  periodically decoupling the heating element from the external power supply for interrupt periods of predetermined duration, the period between successive interrupt periods being selected to confine the duration of the period of propagation time within acceptable limits, the duration of each of said interrupt periods being at least equal to the nominal recovery time of the insulating material.

12. The method of claim 11 wherein the period between successive interrupts is not greater than 16 seconds.

13. The method of claim 12 wherein the duration of said interrupt periods is at least 8 milliseconds.

14. A method of preventing the propagation of a relatively low resistance current path from the heating element to the sheath in a heating unit comprising the concentric assembly of a resistive heating element adapted for energization by an external power supply embedded in an insulating material and enclosed within a metallic sheath adapted for electrical grounding, the insulating material having in its normal state a very high resistance, and in its molten and plasma states having a relatively low resistance, the heating unit being susceptible to a discontinuity developing in the resistive element when energized which can result in electric arcing at the discontinuity, such arcing being effective to reduce the insulating material proximate to the discontinuity to its relatively low resistance molten and plasma state, such reduction of resistance of the insulating material creating a relatively low resistance current path from the discontinuity to the sheath, ultimately rupturing the sheath, the rupture then if unchecked propagating along the length of the heating element, the heating unit having associated therewith a nominal propagation time required for the rupture to propagate along a substantial portion of the length of the heating unit; the insulating material having associated therewith a nominal recovery time required to allow the resultant insulating material to cool to a relatively high resistance state following extinguishing of the arc by interruption of power to the heating element, said method comprising steps of:
  periodically decoupling the heating element from the external power supply for interrupt periods of predetermined duration, the period between successive interrupt periods being less than the nominal propagation time for the heating unit and the duration of each of the interrupt periods being at least equal to the nominal recovery time of the insulating material.

15. The method of claim 14 wherein the period between successive interrupts is not greater than 16 seconds.

16. The method of claim 15 wherein the duration of said interrupt periods is at least 8 milliseconds.

* * * * *